(12) United States Patent
Mino

(10) Patent No.: US 8,699,127 B2
(45) Date of Patent: Apr. 15, 2014

(54) OPTICAL AMPLIFIER

(75) Inventor: Katsuyuki Mino, Tokyo (JP)

(73) Assignee: NEC Corporation, Tokyo (JP)

(*) Notice: Subject to any disclaimer, the term of this patent is extended or adjusted under 35 U.S.C. 154(b) by 296 days.

(21) Appl. No.: 13/085,653

(22) Filed: Apr. 13, 2011

(65) Prior Publication Data

US 2011/0255152 A1 Oct. 20, 2011

(30) Foreign Application Priority Data

Apr. 19, 2010 (JP) ................................ 2010-096104

(51) Int. Cl.
*H01S 3/10* (2006.01)

(52) U.S. Cl.
USPC ........................................ 359/341.43; 398/15

(58) Field of Classification Search
USPC ........................................ 398/15; 359/341.43
See application file for complete search history.

(56) References Cited

U.S. PATENT DOCUMENTS

| | | | | |
|---|---|---|---|---|
| 5,822,112 A | * | 10/1998 | Itou et al. .................. | 359/341.42 |
| 5,923,463 A | * | 7/1999 | Hamada ..................... | 359/341.43 |
| 6,219,177 B1 | * | 4/2001 | Tamura ...................... | 359/341.1 |
| 6,847,478 B1 | * | 1/2005 | Tanaka et al. ............... | 359/334 |
| 6,894,832 B1 | * | 5/2005 | Aweya et al. ............... | 359/341.41 |

FOREIGN PATENT DOCUMENTS

| | | |
|---|---|---|
| JP | 5-308166 A | 11/1993 |
| JP | 6-177837 A | 6/1994 |
| JP | 9-18415 A | 1/1997 |
| JP | 11-275025 A | 10/1999 |
| JP | 2003-46457 A | 2/2003 |
| JP | 2003087204 A | 3/2003 |
| JP | 2003243751 A | 8/2003 |
| JP | 2004-297790 A | 10/2004 |
| JP | 2004-312031 A | 11/2004 |
| JP | 2005295157 A | 10/2005 |
| JP | 2008-510181 A | 4/2008 |

OTHER PUBLICATIONS

Japanese Office Action for JP Application No. 2010-096104 mailed on Dec. 24, 2013 with Partial English Translation.

* cited by examiner

*Primary Examiner* — Mark Hellner
(74) *Attorney, Agent, or Firm* — Sughrue Mion, PLLC

(57) ABSTRACT

An optical amplifier of the present invention includes: an optical amplifier circuit that amplifies input signal light and outputs the amplified light as output signal light; a first monitor for monitoring the presence or absence of the input signal light; and a control circuit that, when receiving a shutdown control signal, controls the optical amplifier circuit such that a shutdown control speed for reducing a level of the output signal light to zero differs according to the presence or absence of the input signal light.

9 Claims, 10 Drawing Sheets

OPTICAL AMPLIFIER

This application is based upon and claims the benefit of priority from Japanese patent application No. 2010-096104, filed on Apr. 19, 2010, the disclosure of which is incorporated herein in its entirety by reference.

BACKGROUND OF THE INVENTION

1. Field of the Invention

The present invention relates to an optical amplifier including a function of controlling a shutdown control speed.

2. Description of the Related Art

Recently, techniques including OADM (optical add drop multiplexing) have been applied to wavelength division multiplexing systems (WDM systems). OADM has particularly become an indispensable technique in a metro-access network connecting a user side and a core network. This is because OADM adds or drops an arbitrary wavelength to and from a wavelength-multiplexed signal, and thereby enables a communication capacity to be promptly changed according to the user, which allows a flexible network to be configured.

Also in this metro-access network, as with related arts, multi-stage optical amplifiers are employed in order to compensate for a loss in a transmission path. Because OADM is adopted, even if output from an upstream optical amplifier is stopped (hereinafter, referred to as "shutdown") in a case where Add signal light is input into a downstream optical amplifier, output from the downstream optical amplifier is not shut down (in general, types of shutdowns include: a shutdown resulting from an interruption of input to an optical amplifier; and a shutdown resulting from factors other than the input interruption, that forcedly terminates output from an optical amplifier when a failure is caused on a transmission path side).

Accordingly, in a case where the speed of shutting down the upstream optical amplifier (more specifically, the speed of reducing the output level of the optical amplifier to zero. Hereinafter, referred to as "shutdown control speed") is faster than the output control speed of the downstream optical amplifier, a transient level variation occurs in Add signal light output from the downstream optical amplifier. This will be described with reference to FIG. 1.

In FIG. 1, it is provided that on time t1 the upstream optical amplifier starts a shutdown in a state where signal light (λ1) from the upstream side and Add signal light (λ2) are input into the downstream optical amplifier controlling output so as to keep the gain constant.

Here, in a case where the shutdown control speed of the upstream optical amplifier is slower than (or equivalent to) the output control speed of the downstream optical amplifier, no transient level variation is caused in the Add signal light output from the downstream optical amplifier.

On the other hand, in a case where the shutdown control speed of the upstream optical amplifier is faster than the output control speed of the downstream optical amplifier, the downstream optical amplifier controls the gain constant with respect to the total of λ1 and λ2 and thus a transient level variation is caused in the Add signal light output from the downstream optical amplifier.

Therefore, in this viewpoint, it is preferable that the shutdown control speed of the upstream optical amplifier be slow.

On the other hand, in case of detection of an input interruption in the optical amplifier, it is expected that the optical amplifier will be immediately shut down in consideration of adverse influence on the human body. A lot of patent applications related thereto have been filed (e.g., JP2005-295157A etc.).

Accordingly, it has recently become a problem to satisfy the both of them, that is to say, to separately control the shutdown control speed based upon a case in which a shutdown results from an input interruption or based upon a case in which a shutdown results from factors other than an input interruption.

SUMMARY OF THE INVENTION

Thus, it is an object of the present invention to provide an optical amplifier capable of solving the aforementioned problem.

The optical amplifier of the present invention includes:

an optical amplifier circuit that amplifies input signal light and outputs the amplified light as output signal light;

a first monitor for monitoring the presence or absence of the input signal light: and a control circuit that, when receiving a shutdown control signal, controls the optical amplifier circuit such that a shutdown control speed for reducing a level of the output signal light to zero differs according to the presence or absence of the input signal light.

The optical amplifier of the present invention, when receiving the shutdown control signal, makes a difference in the shutdown control speed according to the presence or absence of the input signal light.

Accordingly, advantageous effects can be realized in which the shutdown that results from the input interruption and the shutdown that results from factors other that the input interruption can be differentiated from each other, and thereby separately controlling the shutdown control speed in the case of a shutdown resulting from the input interruption and the case of a shutdown resulting from factors other than the input interruption.

The above and other objects, features, and advantages of the present invention will become apparent from the following description with reference to the accompanying drawings which illustrate examples of the present invention.

DESCRIPTION OF THE PREFERRED EMBODIMENTS

Exemplary embodiments for implementing the present invention will hereinafter be described with reference to drawings.

(1) First Exemplary Embodiment

Figure 1:
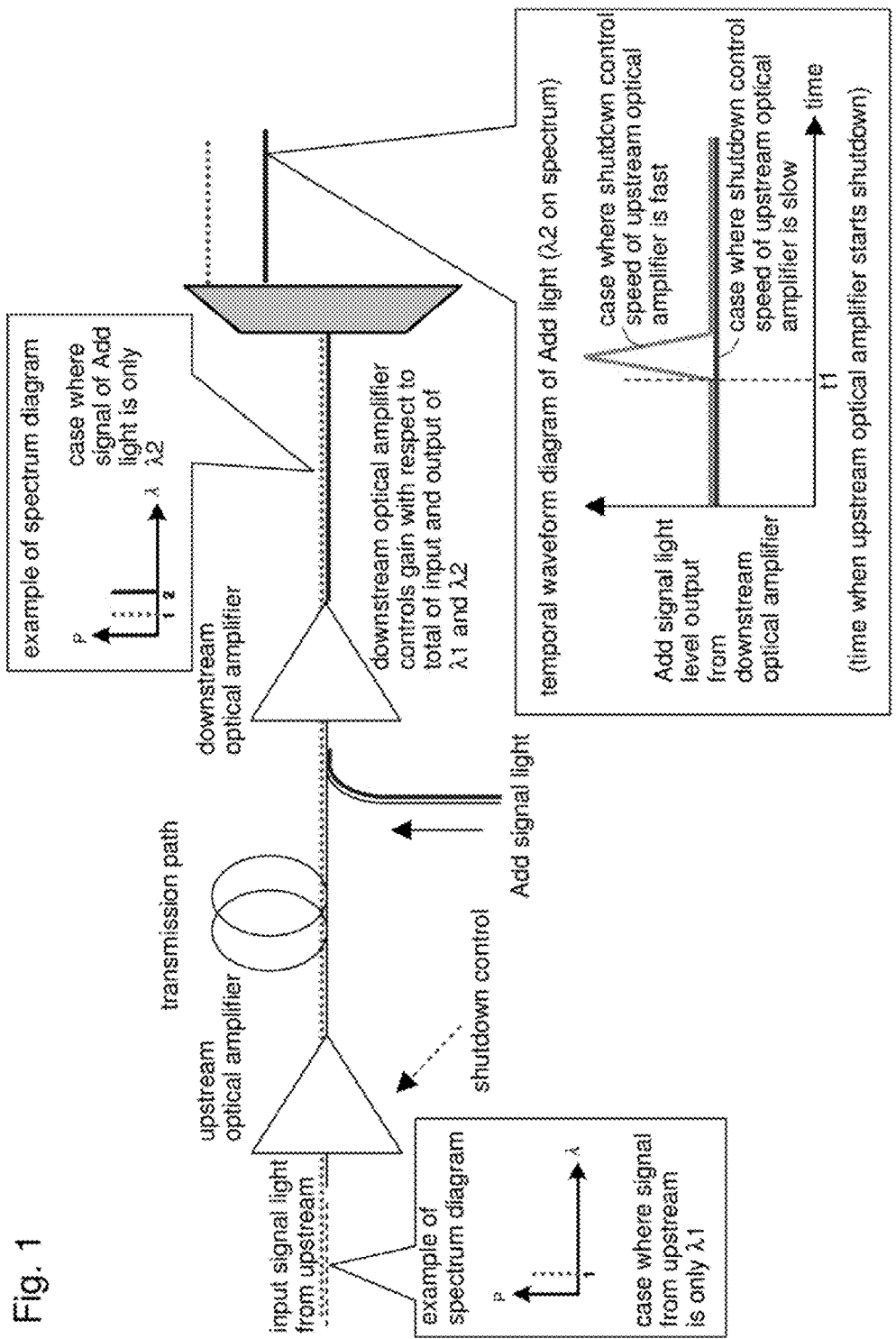
FIG. 1 is a diagram illustrating a problem of a related optical amplifier.
Figure 2:
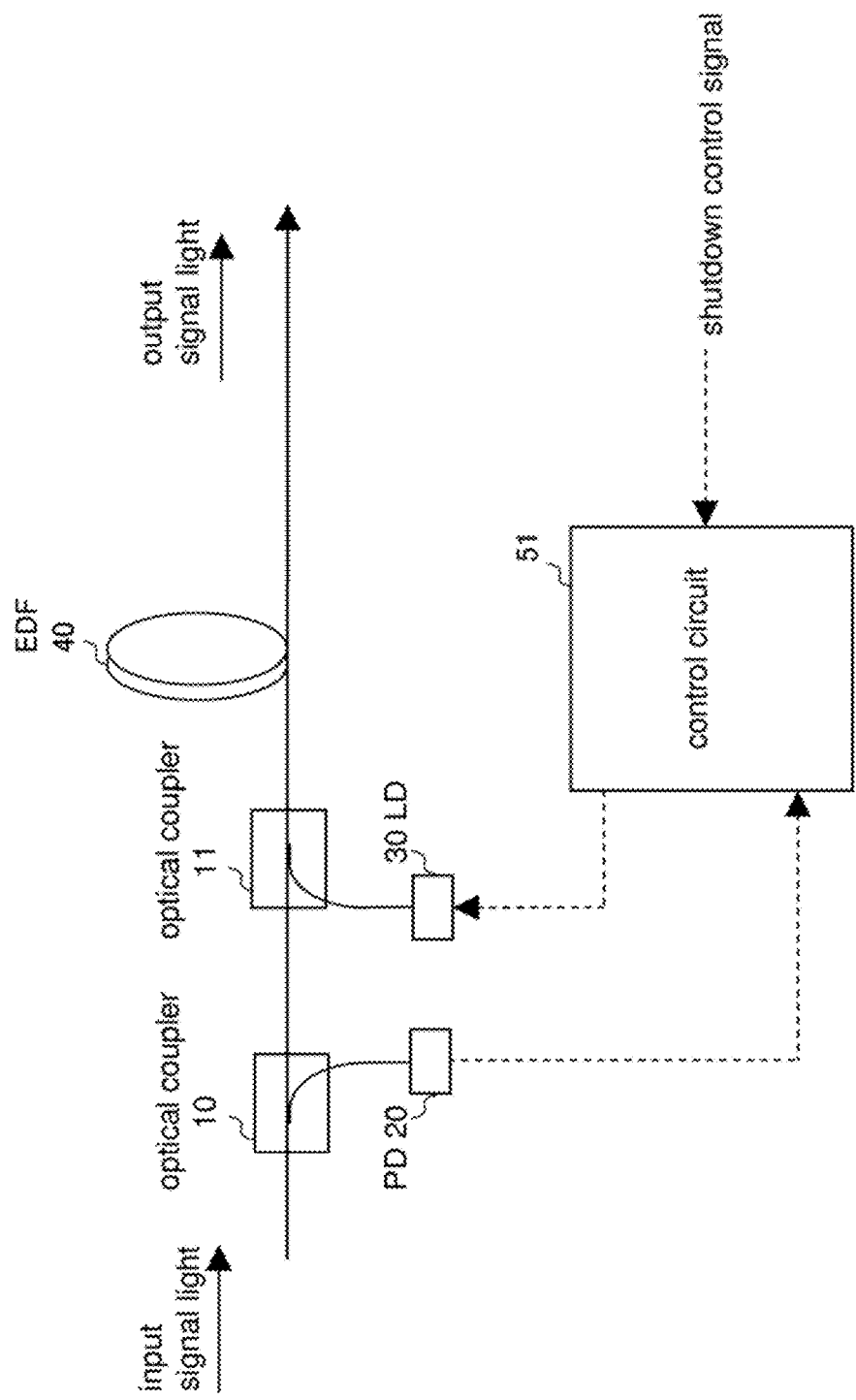
FIG. 2 is a diagram showing a configuration of an optical amplifier of a first exemplary embodiment.

FIG. 2 shows a configuration of an optical amplifier of a first exemplary embodiment.

As shown in FIG. 2, the optical amplifier of this exemplary embodiment includes: optical couplers 10 and 11; PD (Photo Diode) 20, which is to be a first monitor; LD (Laser Diode) 30, which is to be an excitation light generator; EDF (Erbium-Doped Fiber) 40, which is to be an optical amplifying medium; and control circuit 51. In this exemplary embodiment, LD 30 and EDF 40 are elements configuring an optical amplifier circuit.

Optical coupler 10 is connected to PD 20 and optical coupler 11.

Optical coupler 11 is connected to LD 30 and EDF 40.

PD 20 and LD 30 are connected to control circuit 51.

Note that, in FIG. 2, solid lines represent optical connections, and dotted lines represent electric connections (hereinafter, this is also applied to FIGS. 5 and 6 and 8-10).

An operation of the optical amplifier of this exemplary embodiment will hereinafter be described with reference to FIG. 2.

Optical coupler 10 causes a part of input signal light to branch as a monitoring input signal light for monitoring the presence or absence of an input of the input signal light and to input into PD 20.

PD 20 converts the monitoring input signal light into an electric signal, and notifies control circuit 51 of an input monitor value representing the level of the converted electric signal.

LD 30 generates excitation light having a level according to a bias setting value set by control circuit 51. When the bias setting value becomes zero, the excitation light level also becomes zero.

Optical coupler 11 multiplexes the input signal light other than that for monitoring with the excitation light generated by LD 30, and inputs the multiplexed light into EDF 40.

Er3+ (Erbium ions) in EDF 40 is excited by the excitation light input from optical coupler 11. The exited Er3+ amplifies the input signal light, and EDF 40 outputs the amplified light as output signal light. Here, EDF 40 amplifies the input signal light by a gain according to the excitation light level. When the excitation light level becomes zero, the level of the output signal light also becomes zero.

When control circuit 51 receives a shutdown control signal from the outside, control circuit 51 makes a difference in reduction pattern of the bias setting value of LD 30 according to the presence or absence of the input signal light.

Here, a characteristic operation of this exemplary embodiment, which is an operation when control circuit 51 receives the shutdown control signal, is described with reference to FIG. 3.

Figure 3:
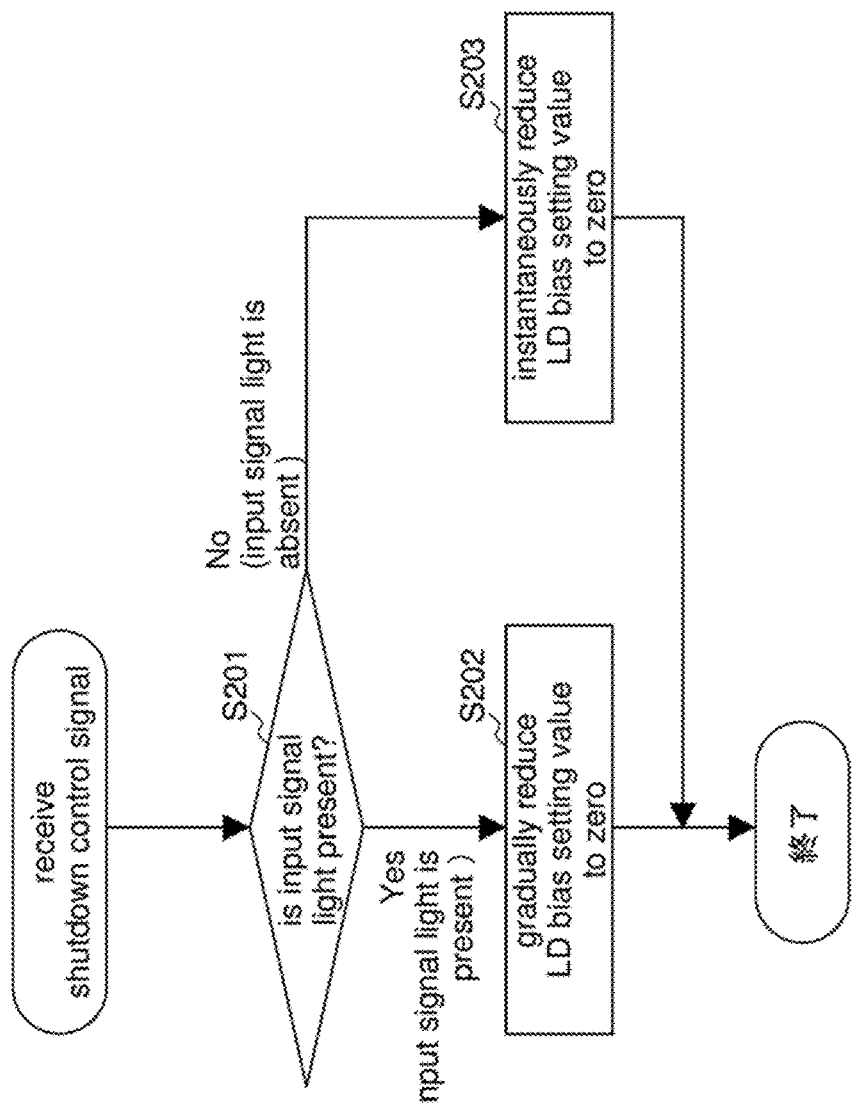
FIG. 3 is a flowchart illustrating an operation of the optical amplifier shown in FIG. 2 when a shutdown control signal is received.

As shown in FIG. 3, when control circuit 51 receives the shutdown control signal, control circuit 51 determines the presence or absence of the input signal light on the basis of the input monitor value notified from PD 20 (step S201).

Here, for example, if the input monitor value is at least a certain threshold, control circuit 51 determines that the input signal light is present. If the value is less than the threshold, control circuit 51 determines that the input signal light is absent.

If the input signal light is present in step S201, control circuit 51 gradually reduces the bias setting value of LD 30 to zero (step S202).

On the other hand, if the input signal light is absent in step S201, control circuit 51 instantaneously reduces the bias setting value of LD 30 to zero (step S203).

Figure 4:
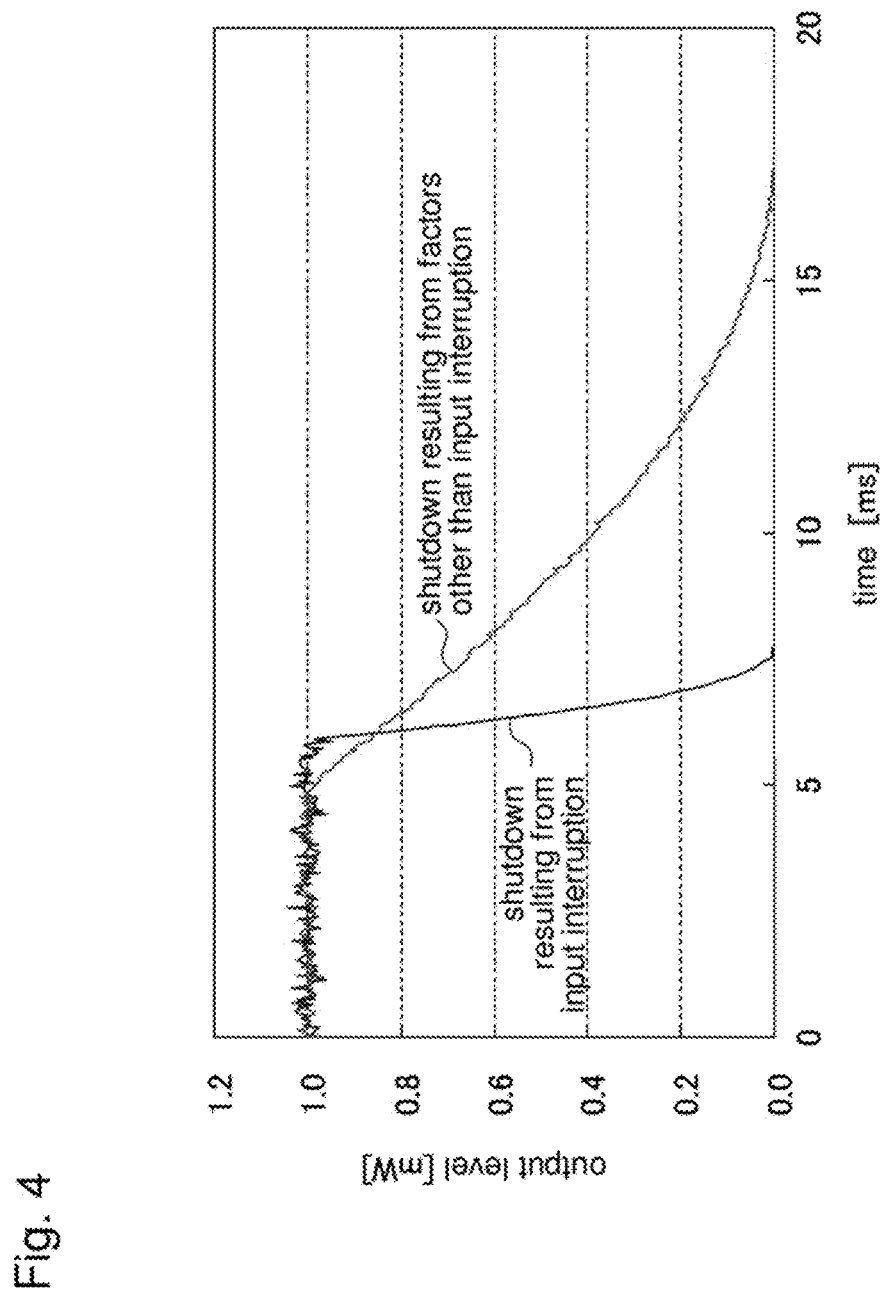
FIG. 4 is a diagram showing an evaluation result of an output level from the optical amplifier shown in FIG. 2.

Accordingly, this exemplary embodiment enables the shutdown control to, when receiving the shutdown control signal, if the input signal light is absent, instantaneously reduces the level of the output signal light to zero, and, if the input signal light is present, gradually reduce the output signal light to zero. For reference purposes, FIG. 4 shows an example of an evaluation result of the level of the output signal light.

In this exemplary embodiment, the reduction patterns of the level of the output signal light are not limited to the above case. It is sufficient that at least the shutdown control speed when the input signal light is present, be slower than the shutdown control speed when the input signal light is absent (likewise, this is applied to exemplary embodiments below).

However, taking into account risks to the human body, the shutdown control speed when the input signal light is absent is adjusted to the shutdown control time so as to not adversely affect the human body.

The shutdown control speed when the input signal light is present may be constant or changed [e.g., in a case where the level of the input signal light is high enough to adversely affect the human body, the shutdown control speed is set to be high (first speed) until the level of the output signal light reaches a safe level, and the shutdown control speed is slowed down (second speed slower than the first speed) after the level has reached the safe level].

As described above, in this exemplary embodiment, when the shutdown control signal is received, different shutdown control speeds can be decided according to the presence or absence of the input signal light.

Accordingly, the shutdown that results from the input interruption and the shutdown that results from factors other that the input interruption can be differentiated from each other, and the shutdown control speeds can be separately controlled for a case in which a shutdown results from the input interruption and for a case in which a shutdown results from factors other than the input interruption.

Further, in this exemplary embodiment, the shutdown control speed in the case of the shutdown resulting from factors other than the input interruption is made slower than the shutdown control speed in the case of the shutdown resulting from the input interruption.

Thus, in the case in which the shutdown results from factors other than the input interruption, the attenuation speed of the output signal light can be made slower. Accordingly, the transient level variation of the downstream optical amplifier can be suppressed.

Moreover, in the case in which the shutdown results from the input interruption, the shutdown can be made immediately so as not to adversely affect the human body.

(2) Second Exemplary Embodiment

Figure 5:
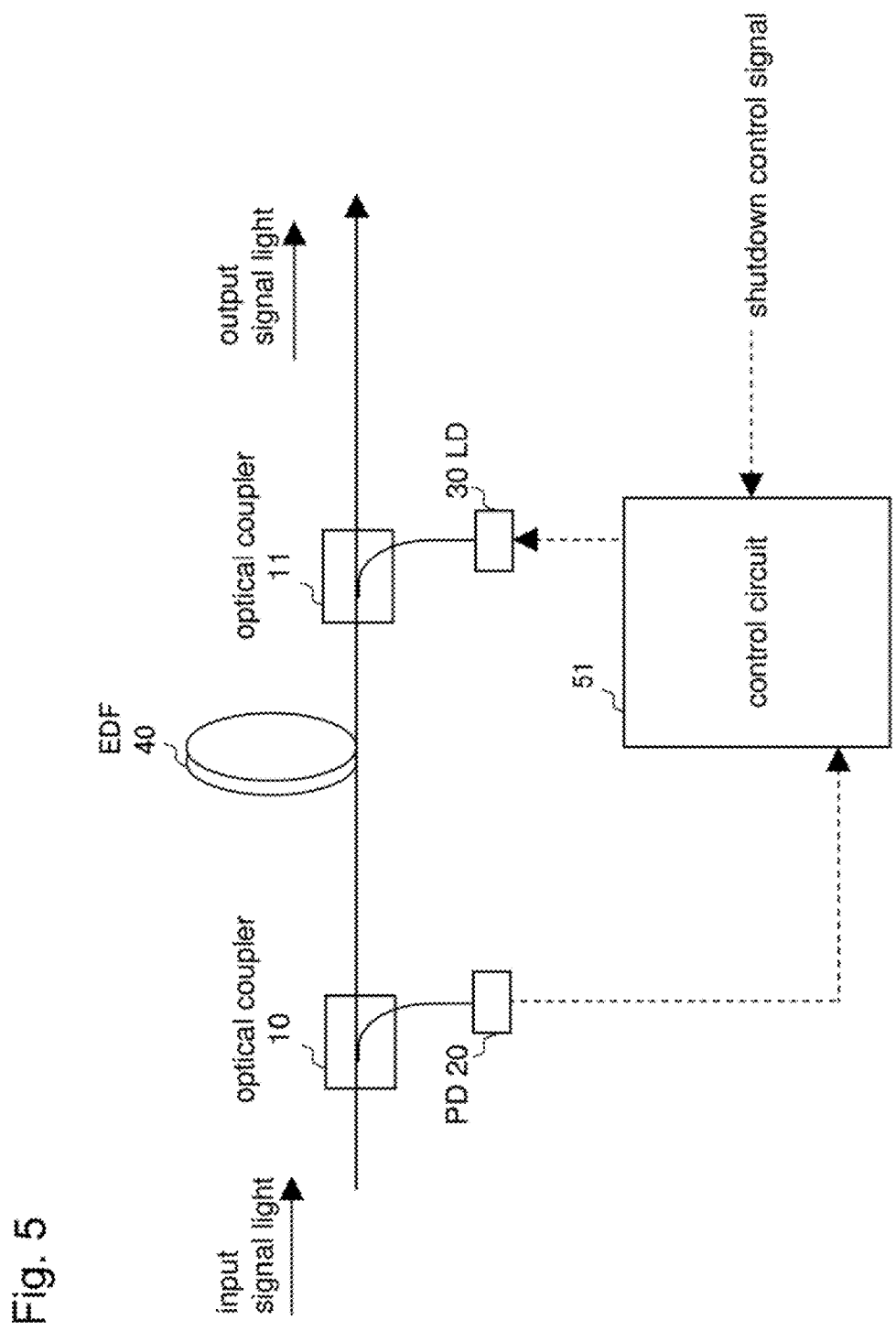
FIG. 5 is a diagram showing a configuration of an optical amplifier of a second exemplary embodiment.

FIG. 5 shows a configuration of an optical amplifier of a second exemplary embodiment.

As shown in FIG. 2, the optical amplifier of the first exemplary embodiment arranges optical coupler 11 and LD 30 upstream from EDF 40, and LD 30 excites the EDF 40 from the upstream side.

On the other hand, as shown in FIG. 5, the optical amplifier of this exemplary embodiment is different from the optical amplifier of the first exemplary embodiment shown in FIG. 2 in that optical coupler 11 and LD 30 are arranged downstream from EDF 40, and LD 30 excites EDF 40 from the downstream side.

Other configurations and operations other than the above are identical to those of the first exemplary embodiment.

Accordingly, this exemplary embodiment is also capable of performing a shutdown control equivalent to that of the first exemplary embodiment.

(3) Third Exemplary Embodiment

Figure 6:
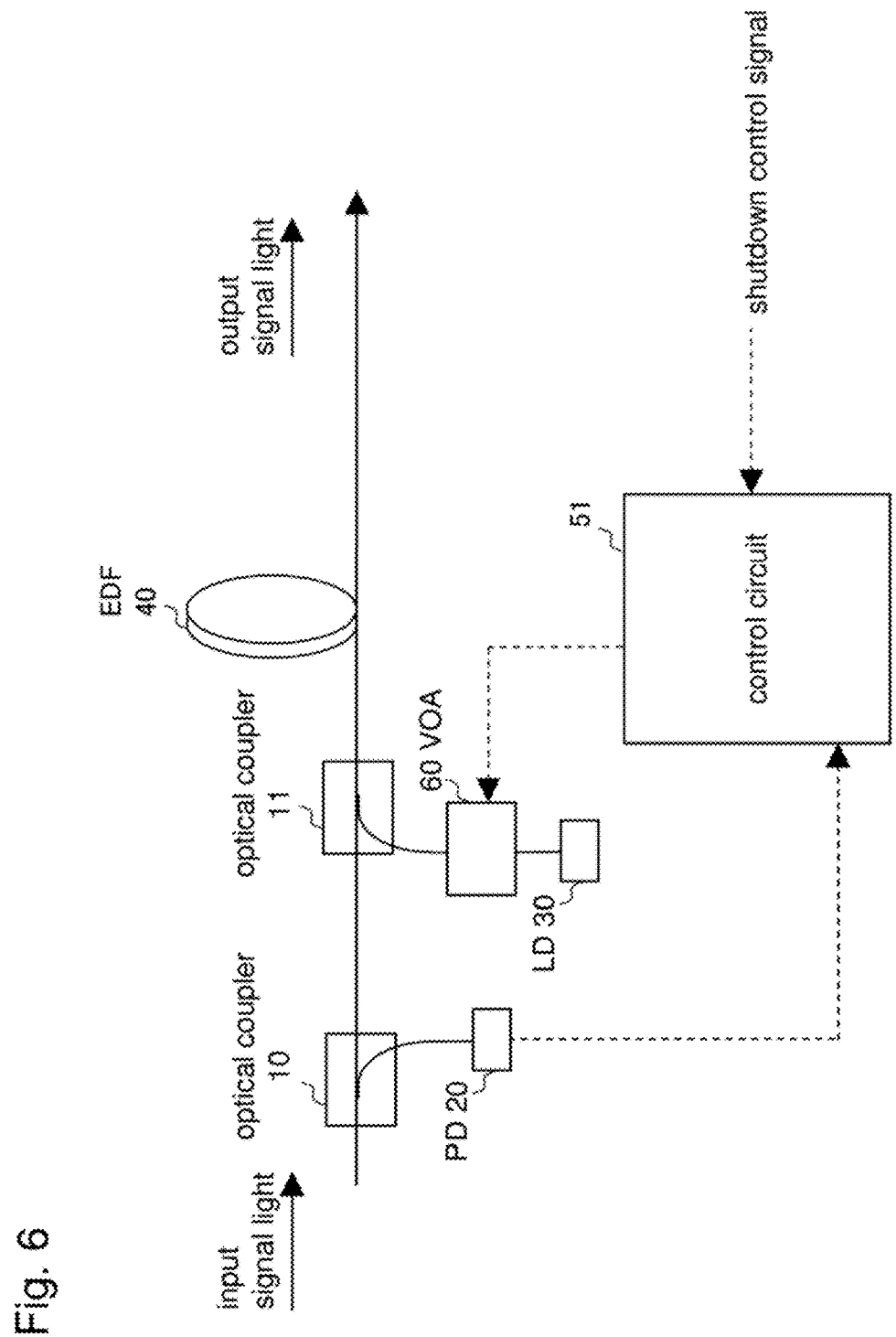
FIG. 6 is a diagram showing a configuration of an optical amplifier of a third exemplary embodiment.

FIG. 6 shows a configuration of an optical amplifier of a third exemplary embodiment.

As shown in FIG. 6, the optical amplifier of this exemplary embodiment is different from the optical amplifier of the first exemplary embodiment shown in FIG. 2 in that VOA (Variable Optical Attenuator) 60 is connected to an output side of LD 30, and in that control circuit 51 controls VOA 60 instead of LD 30. In this exemplary embodiment, not only LD 30 and EDF 40 but also VOA 60 become configurational elements of the optical amplifier circuit.

LD 30 generates a certain level of excitation light.

VOA 60 attenuates the excitation light generated by LD 30 by an attenuation amount according to a drive setting value set by control circuit 51. When the drive setting value becomes the maximum value, the excitation light level becomes zero.

Optical coupler 11 multiplexes the input signal light other than that for monitoring with the excitation light attenuated by VOA 60, and inputs the multiplexed light into EDF 40.

When control circuit 51 receives a shutdown control signal from the outside, control circuit 51 makes a difference in increasing pattern of the drive setting value for VOA 60 according to the presence or absence of the input signal light.

Other configurations and operations other than the above are identical to those of the first exemplary embodiment.

Here, a characteristic operation of this exemplary embodiment, which is an operation when control circuit 51 receives the shutdown control signal, is described with reference to FIG. 7.

Figure 7:
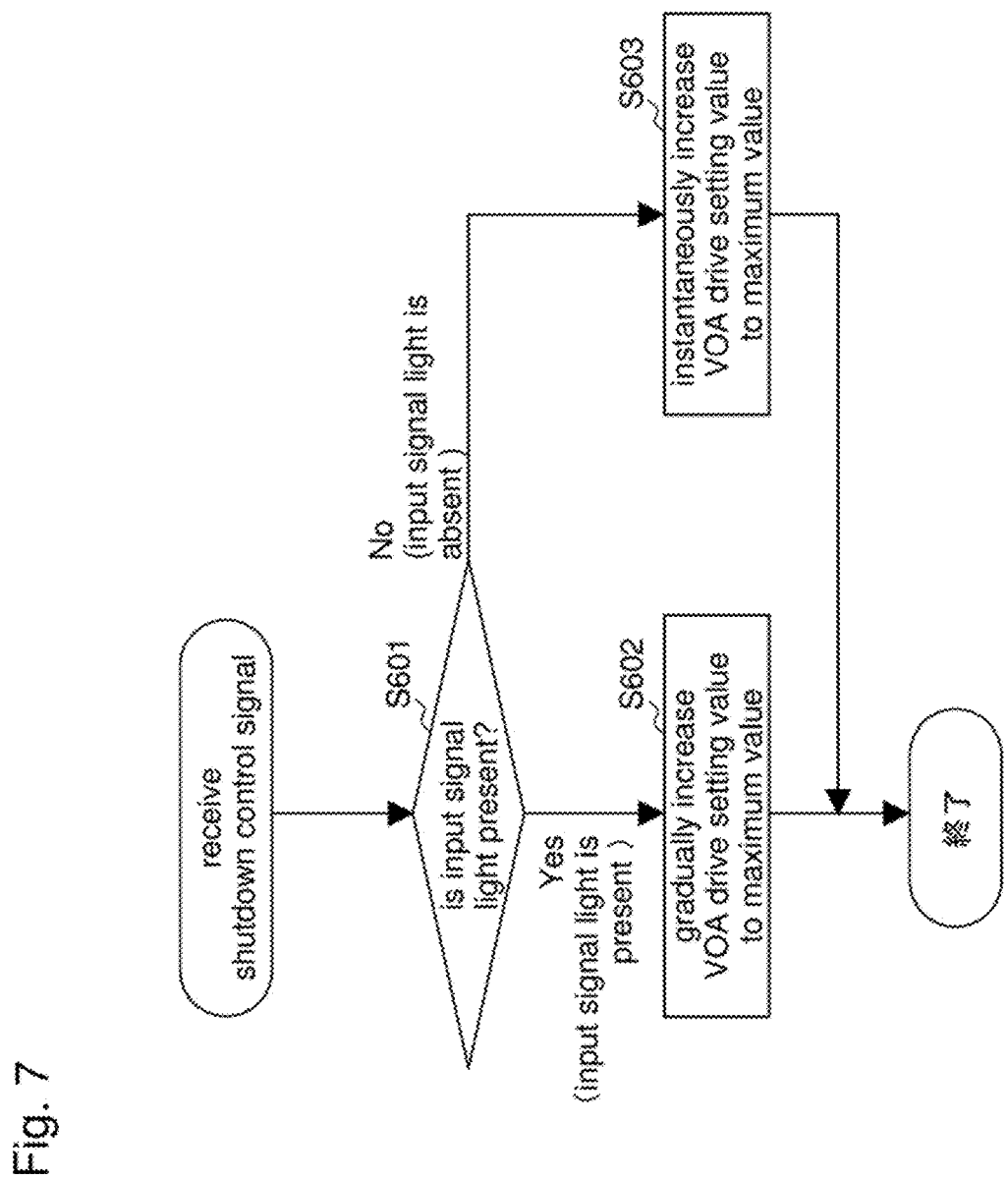
FIG. 7 is a flowchart showing an operation of the optical amplifier shown in FIG. 6 when a shutdown control signal is received.

As shown in FIG. 7, when control circuit 51 receives the shutdown control signal, control circuit 51 determines the presence or absence of the input signal light on the basis of the input monitor value notified from PD 20 (step S601).

Here, for example, if the input monitor value is at least a certain threshold, control circuit 51 determines that the input signal light is present. If the value is less than the threshold, control circuit 51 determines that the input signal light is absent.

If the input signal light is present in step S601, control circuit 51 gradually increases the drive setting value of VOA 60 to the maximum value (step S602).

On the other hand, if the input signal light is absent in step S601, control circuit 51 instantaneously increases the drive setting value of VOA 60 to the maximum value (step S603).

Accordingly, this exemplary embodiment is also capable of performing a shutdown control equivalent to that of the first exemplary embodiment.

In this exemplary embodiment, VOA 60 can be replaced with an optical switch or the like having an equivalent function.

(4) Fourth Exemplary Embodiment

Figure 8:
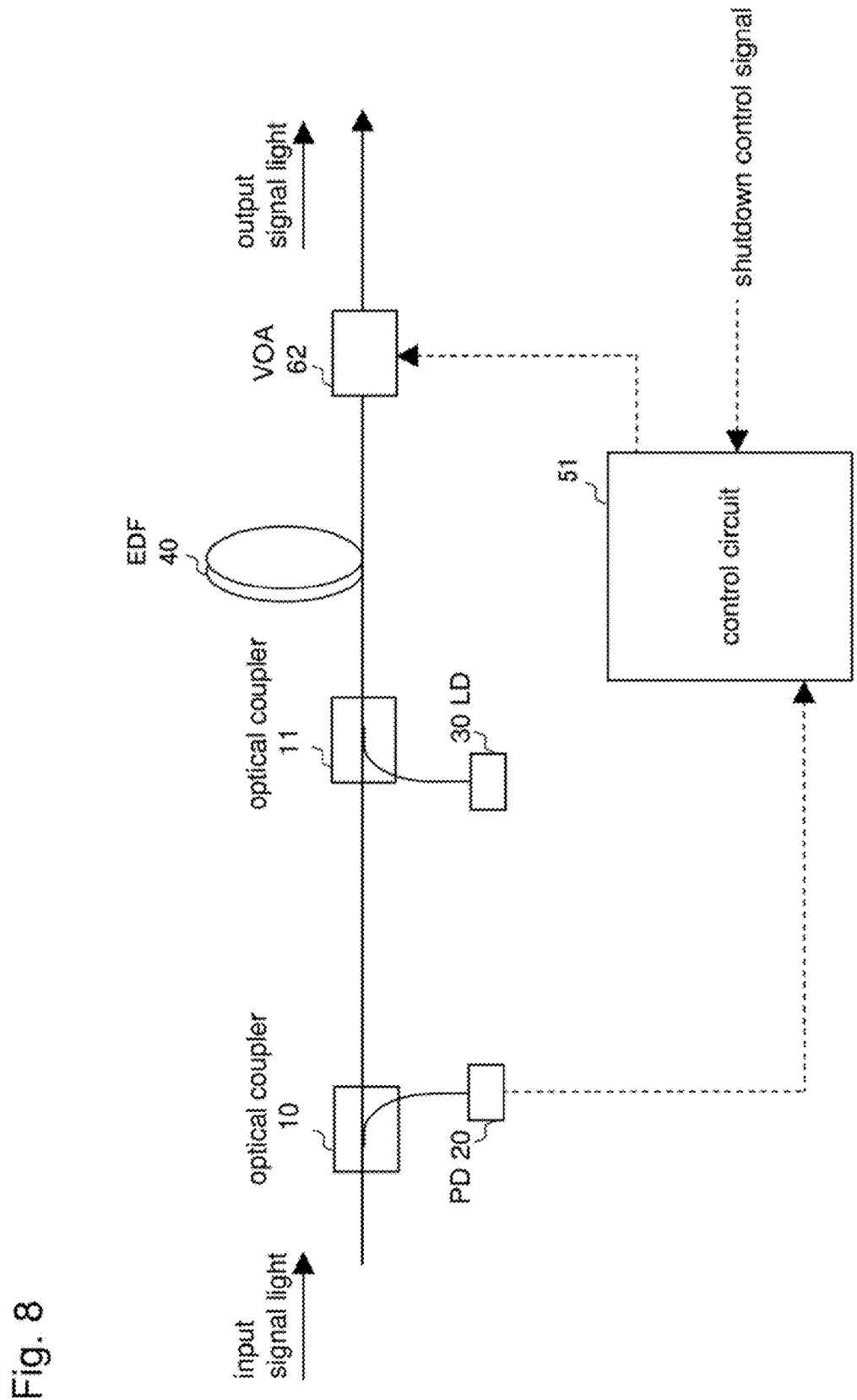
FIG. 8 is a diagram showing a configuration of an optical amplifier of a forth exemplary embodiment.

FIG. 8 shows a configuration of an optical amplifier of a fourth exemplary embodiment.

As shown in FIG. 8, the optical amplifier of this exemplary embodiment is different from the optical amplifier of the first exemplary embodiment shown in FIG. 2 in that VOA 62 is connected downstream from EDF 40, and in that control circuit 51 controls VOA 62 instead of LD 30. In this exemplary embodiment, not only LD 30 and EDF 40 but also VOA 62 become configurational elements of the optical amplifier circuit.

LD 30 generates a certain level of excitation light.

EDF 40 amplifies input signal light by means of Er3+ excited by excitation light input from optical coupler 11, and inputs the amplified light into VOA 62. Here, EDF 40 amplifies the input signal light by a gain according to the excitation light level.

VOA 62 attenuates the signal light amplified by EDF 40 by an attenuation amount according to a drive setting value set by control circuit 51, and outputs the attenuated light as output signal light. When the drive setting value becomes the maximum value, the output signal light becomes zero.

When control circuit 51 receives a shutdown control signal from the outside, control circuit 51 makes a difference in increasing pattern of the drive setting value of VOA 62 according to the presence or absence of the input signal light. The flowchart thereof is identical to that of FIG. 7.

Other configurations and operations other than the above are identical to those of the first exemplary embodiment.

Accordingly, this exemplary embodiment is also capable of performing a shutdown control equivalent to that of the first exemplary embodiment.

In this exemplary embodiment, VOA 62 may be replaced with an optical switch or the like having an equivalent function.

(5) Fifth Exemplary Embodiment

Figure 9:
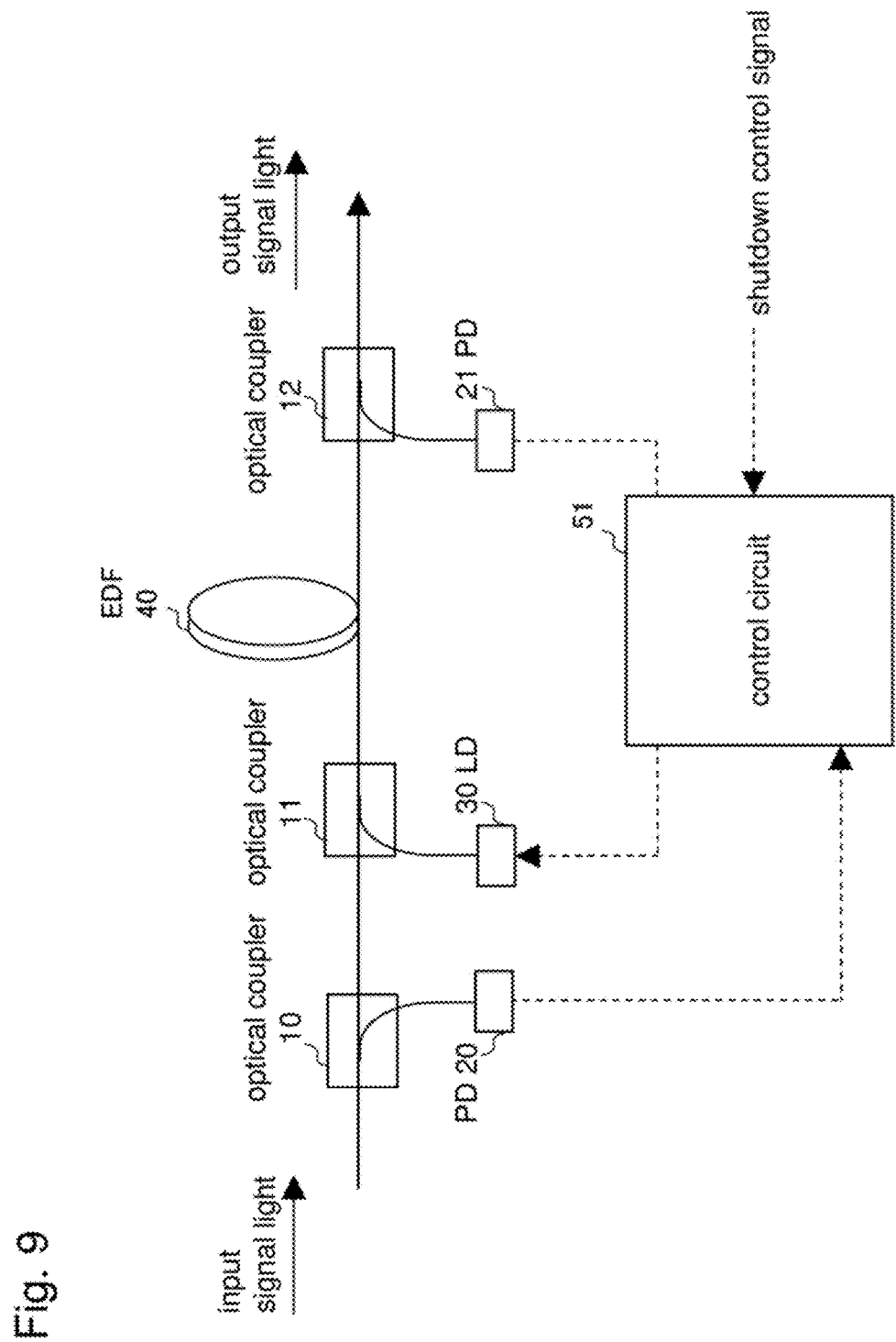
FIG. 9 is a diagram showing a configuration of an optical amplifier of a fifth exemplary embodiment.

FIG. 9 shows a configuration of an optical amplifier of a fifth exemplary embodiment.

As shown in FIG. 9, the optical amplifier of this exemplary embodiment is different from the optical amplifier of the first exemplary embodiment shown in FIG. 2 in that optical coupler 12 is connected downstream from EDF 40, and in that control circuit 51 and optical coupler 12 are connected with PD 21 which is to be a second monitor.

Optical coupler 12 causes a part of reflected light of output signal light to branch as monitoring reflected light for monitoring a reflection level of the output signal light and to input into PD 21.

PD 21 converts the monitoring reflected light into an electric signal, and notifies control circuit 51 of a reflected monitor value representing the level of the converted electric signal.

When the reflected monitor value representing the reflection level of the output signal light becomes at least a certain value, control circuit 51 determines that the reflection is present, and performs processes of the flowchart of FIG. 3 as with the case of receiving the shutdown control signal.

In this exemplary embodiment, this allows a shutdown control equivalent to that of the first exemplary embodiment, not only in the case of receiving the shutdown control signal, but also in a case of determining that the reflection is present according to the reflection level of the output signal light.

This enables the influence exerted by the reflection of the output signal light on the downstream optical amplifier to be alleviated. However, the shutdown control speed when it is determined that the reflection is present is set to a speed in consideration of a risk to the human body [e.g., when the input signal light is present, in a case of gradually reducing the level of the output signal light to zero, the shutdown control speed is set to be high (first speed) until the level of the output signal light reaches a safe level, and the shutdown control speed is slowed down (second speed slower than the first speed) after the level has reached the safe level].

(6) Sixth Exemplary Embodiment

Figure 10:
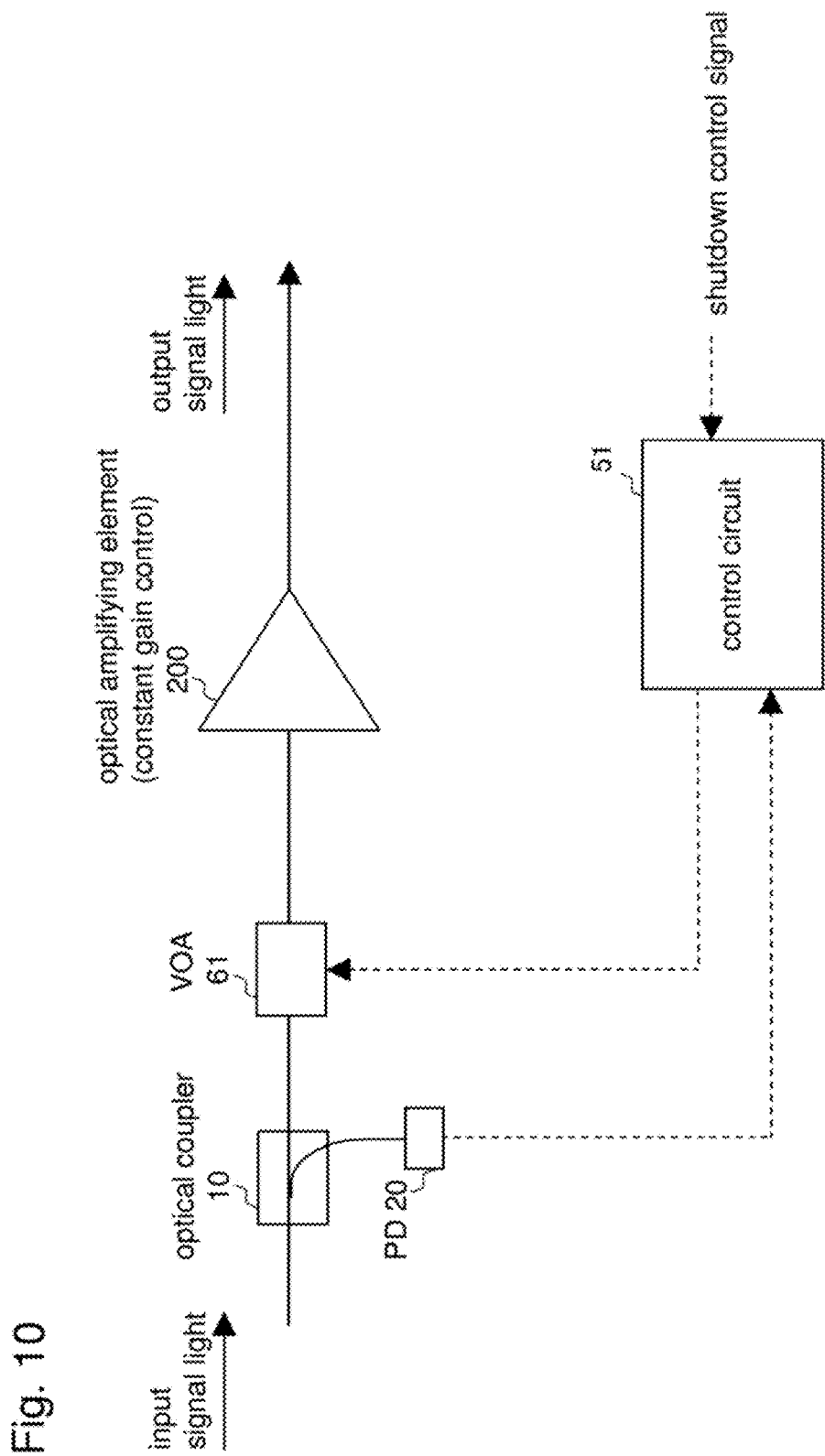
FIG. 10 is a diagram showing a configuration of an optical amplifier of a sixth exemplary embodiment.

FIG. 10 shows a configuration of an optical amplifier of a sixth exemplary embodiment.

As shown in FIG. 10, the optical amplifier of this exemplary embodiment is different from the optical amplifier of the first exemplary embodiment shown in FIG. 2 in that VOA 61 and optical amplifying element 200 are arranged instead of optical coupler 11, LD 30 and EDF 40, and in that control circuit 51 controls VOA 61. In this exemplary embodiment, VOA 61 and optical amplifying element 200 become configurational elements of the optical amplifier circuit.

Optical coupler 10 is connected to PD 20 and VOA 61.

VOA 61 is connected to control circuit 51 and an input side of optical amplifying element 200.

VOA 61 attenuates input signal light input from optical coupler 10 by an attenuation amount according to a drive setting value set by control circuit 51, and inputs the attenuated light into optical amplifying element 200. When the drive setting value becomes the maximum value, the level of the signal light to be input into optical amplifying element 200 becomes zero.

Optical amplifying element 200 amplifies the signal light input from VOA 61 by a certain gain, and outputs the amplified light as output signal light, and may be realized by an existing optical amplifier controlling output by a constant gain.

When control circuit 51 receives a shutdown control signal from the outside, control circuit 51 makes a difference in increasing pattern of the drive setting value of VOA 61 according to the presence or absence of the input signal light. The flowchart thereof is identical to that of FIG. 7.

Other configurations and operations other than the above are identical to those of the first exemplary embodiment.

That is, in this exemplary embodiment, only the addition of a part of a basic configuration of the present invention to an existing optical amplifier that controls output by a constant gain enables a shutdown control equivalent to that of the first exemplary embodiment to be performed. The shutdown control speed of this exemplary embodiment is determined by the attenuation amount of VOA 61 and the output control speed of optical amplifying element 200.

Note that, in first to fifth exemplary embodiments, although the description has been made of a the case where the number of LDs is one, the number of LDs may be plural. According to this case, in first, second and fifth exemplary embodiments, the plurality of LDs may be controlled by control circuit 51.

In third, fourth and sixth exemplary embodiments, although the description has been made of a case where the number of VOAs is one, the number of VOAs may be plural. The plurality of VOAs may be controlled by control circuit 51.

While the invention has been particularly shown and described with reference to exemplary/embodiments thereof, the invention is not limited to these embodiments. It will be understood by those of ordinary skill in the art that various changes in form and details may be made therein without departing from the spirit and scope of the present invention as defined by the claims.

What is claimed is:

1. An optical amplifier, comprising:
an optical amplifier circuit that amplifies input signal light and outputs the amplified light as output signal light;
a first monitor for monitoring whether or not a level of the input signal light is at least a certain threshold; and
a control circuit that, when receiving a shutdown control signal, controls the optical amplifier circuit such that a shutdown control speed for reducing a level of the output signal light to zero differs according to whether or not the level of the input signal light is at least the threshold.

2. The optical amplifier according to claim 1, wherein the control circuit makes the shutdown control speed when the level of the input signal light is at least the threshold, slower than the shutdown control speed when the level of the input signal light is less than the threshold.

3. The optical amplifier according to claim 2, wherein the control circuit instantaneously reduces the level of the output signal light to zero if the level of the input signal light is less than the threshold, and gradually reduces the level of the output signal light to zero if the level of the input signal light is at least the threshold.

4. The optical amplifier according to claim 3,
wherein the optical amplifier circuit includes
an excitation light generator generating excitation light having a level according to a bias setting value, and
an optical amplifying medium that amplifies the input signal light by a gain according to the excitation light level generated by the excitation light generator, and outputs the amplified light as the output signal light, and
the control circuit, when receiving the shutdown control signal, instantaneously reduces the bias setting value of the excitation light generator to zero if the level of the input signal light is less than the threshold, and gradually reduces the bias setting value of the excitation light generator to zero if the level of the input signal light is at least the threshold.

5. The optical amplifier according to claim 4, further comprising
a second monitor for monitoring a reflection level of the output signal light,
wherein the control circuit, when the reflection level of the output signal light becomes at least a threshold, instantaneously reduces the bias setting value of the excitation light generator to zero if the level of the input signal light is less than the threshold, and gradually reduces the bias setting value of the excitation light generator to zero if the level of the input signal light is at least the threshold.

6. The optical amplifier according to claim 3,
wherein the optical amplifier circuit includes
an excitation light generator generating excitation light,
a variable optical attenuator attenuating the excitation light generated by the excitation light generator by an attenuation amount according to a drive setting value, and
an optical amplifying medium that amplifies the input signal light by a gain according to an excitation light level attenuated by the variable optical attenuator, and outputs the amplified light as the output signal light, and
the control circuit, when receiving the shutdown control signal, instantaneously increases the drive setting value of the variable optical attenuator to a maximum value if the level of the input signal light is less than the threshold, and gradually increases the drive setting value of the variable optical attenuator to the maximum value if the level of the input signal light is at least the threshold.

7. The optical amplifier according to claim 3,
wherein the optical amplifier circuit includes
an excitation light generator generating excitation light,
an optical amplifying medium amplifying the input signal light by a gain according to an excitation light level generated by the excitation light generator, and
a variable optical attenuator that attenuates the signal light amplified by the optical amplifying medium by an attenuation amount according to a drive setting value, and outputs the attenuated light as the output signal light, and the control circuit, when receiving the shutdown control signal, instantaneously reduces the drive setting value of the variable optical attenuator to zero if the level of the input signal light is less than the threshold, and gradually reduces the drive setting value of the variable optical attenuator to zero if the level of the input signal light is at least the threshold.

8. The optical amplifier according to claim 3,
wherein the optical amplifier circuit includes
a variable optical attenuator attenuating the input signal light by an attenuation amount according to a drive setting value, and
an optical amplifying element that amplifies the input signal light attenuated by the variable optical attenuator by a certain gain, and outputs the amplified light as the output signal light, and
the control circuit, when receiving the shutdown control signal, instantaneously reduces the drive setting value of the variable optical attenuator to zero if the level of the input signal light is less than the threshold, and gradually reduces the drive setting value of the variable optical attenuator to zero if the level of the input signal light is at least the threshold.

9. The optical amplifier according to claim 2,
wherein the control circuit, when receiving the shutdown control signal, changes the shutdown control speed if the level of the input signal light is at least the threshold.

\* \* \* \* \*